United States Patent [19]
Harvey et al.

[11] Patent Number: 5,904,170
[45] Date of Patent: May 18, 1999

[54] PRESSURE FLOW AND CONCENTRATION CONTROL OF OXYGEN/OZONE GAS MIXTURES

[75] Inventors: Keith Harvey, Cupertino; Quoc Truong, San Jose; Irwin Silvestre, Santa Clara, all of Calif.

[73] Assignee: Applied Materials, Inc., Santa Clara, Calif.

[21] Appl. No.: 08/856,499

[22] Filed: May 14, 1997

[51] Int. Cl.$^6$ ...................................................... G05D 11/03
[52] U.S. Cl. ......................... 137/9; 73/23.2; 422/186.14; 137/487.5
[58] Field of Search ........................ 73/23.2; 422/186.14, 422/186.07, 186.08, 186.12; 137/487.5, 9

[56] References Cited

U.S. PATENT DOCUMENTS

| | | |
|---|---|---|
| 3,549,528 | 12/1970 | Armstrong . |
| 3,763,877 | 10/1973 | Lieb . |
| 4,379,402 | 4/1983 | Harman ..................................... 73/23.2 |
| 5,069,880 | 12/1991 | Karlson ............................... 422/186.07 |
| 5,151,250 | 9/1992 | Conrad . |
| 5,332,555 | 7/1994 | Hosokawa ........................... 422/186.12 |
| 5,364,505 | 11/1994 | Funk .................................... 422/186.14 |
| 5,370,846 | 12/1994 | Yokomi ............................... 422/186.14 |
| 5,644,070 | 7/1997 | Gibboney ................................ 73/23.2 |

*Primary Examiner*—Denise L. Ferensic
*Assistant Examiner*—Ramyar Farid
*Attorney, Agent, or Firm*—Townsend & Townsend & Crew

[57] ABSTRACT

A system for controlling pressure flow and concentration Of $O_3/O_2$ positions a thermal MFC upstream from an ozone generator to avoid the adverse effects of ozone on the thermal MFC. A flow restrictor diverts a precise amount of flow to an ozone monitor so that the flow to a CVD chamber is precisely controlled. In other embodiments a full-flow ozone monitor and non-thermal MFC are utilized.

1 Claim, 2 Drawing Sheets

PRESSURE FLOW AND CONCENTRATION CONTROL OF OXYGEN/OZONE GAS MIXTURES

BACKGROUND OF THE INVENTION

The present invention relates to the processing of substrates. More particularly, the present invention relates to an improved method and apparatus for precisely controlling the mass flow rate of an oxygen/ozone mixture introduced into semiconductor substrate processing chambers for chemical vapor deposition (CVD) and other processing steps.

Many CVD processes require precise control of the flow rates of precursor gases utilized to deposit films. For example, high quality subatmospheric chemical vapor deposition (herein "SACVD") oxide films are formed from the thermal reaction of tetraethylorthosilicate (herein "TEOS") and ozone. The properties of the film are affected by the amount of ozone flowing into the chamber. As is well-known in the art, thermal mass flow controllers (MFCs) are utilized to measure and control the flow rate of precursor gases supplied to a CVD chamber. Because the output gas flow rate of the MFC is precisely controlled, the MFC output is typically placed adjacent to the input port of a CVD chamber to assure that flow into the chamber is of the same magnitude as the desired flow from the MFC output port.

FIG. 1 illustrates a typical existing ozone supply system 10. A flow of oxygen is supplied from an oxygen source 12 to an ozone generator 14 which converts a percentage of the oxygen to ozone. The pressure at the input port of the ozone generator 14 is controlled by a pressure regulator 15. A small part of the gas flow from the ozone generator 14 is diverted to a low flow ozone monitor 16 which measures the relative proportions of oxygen and ozone supplied by the ozone generator. The main flow from the ozone generator 14, however, is directed to an MFC 18 which supplies a precisely controlled flow of the ozone/oxygen mix to a CVD chamber 20. Because the mass flow of the ozone/oxygen gas into the CVD chamber 20 is precisely controlled by the MFC 18, and the relative proportions of the oxygen and ozone gases in the flow are measured by the low flow ozone monitor 16, the flow of ozone into the CVD chamber is precisely controlled.

The ozone generator 14 is controllable to convert a specified amount of the input oxygen flow into ozone. The accuracy of the ozone generator 14, however, is not sufficient for many CVD processes. Accordingly, a part of the output flow from the ozone generator 14 is diverted to the low flow ozone monitor 16 to precisely measure the amount of ozone generated as a proportion of the total output flow of the ozone generator. In the system depicted in FIG. 1, the gas flow diverted to the low flow ozone monitor 16 is dumped from the system because of contaminants introduced by the low flow ozone monitor 16.

FIG. 2 is a schematic diagram of a typical thermal MFC. The MFC includes a mass flow meter (MFM) 30 and a proportional controller 40. The MFM 30 includes a heated sensing tube 32 where the mass flow is measured and a bypass 34 through which the majority of flow passes. The proportional controller 40 includes a displacement valve 42 and control electronics. The operation of the MFC is well known and will not be further described.

The performance of the heated sensing tube 32 deteriorates when ozone flows through the tube, making the magnitude of the mass flow difficult to precisely control. Although the precise reasons for this deterioration are not fully understood, it is believed that corrosion of the heated sensing tube 32 and conversion between ozone and oxygen within the heated sensing tube 32 may be contributing factors.

One possible method of reducing or altogether preventing the deteriorating performance of tube 32 is to place the mass flow controller upstream of the ozone generator. Such a placement would eliminate the flow of ozone through the heated sensing tube 32 but, because the remoteness of the MFC from the CVD chamber creates uncertainty that the precise flow to the chamber is being measured, is unsatisfactory for many applications unless other measures to regulate and monitor the flow into the chamber are taken.

SUMMARY OF THE INVENTION

According to one aspect of the invention, the adverse effects of ozone on a thermal MFC are avoided by placing the MFC upstream from the ozone generator. The flow diverted through a flow restrictor to an off-line ozone monitor is controlled by a back-pressure regulator coupled downstream from the ozone generator. Thus, from conservation of mass, the flow to the chamber is the difference of the flow measured by the MFC and the flow diverted by the flow restrictor (and dumped from the system). Thus, the ozone flow to the chamber is precisely regulated and damage to the thermal MFC is avoided.

According to another aspect of the invention, a full-flow in-line ozone monitor is utilized. The thermal MFC is disposed upstream from the ozone generator to avoid damage from ozone flow. The full-flow in-line ozone monitor does not dump gas from the system. Thus, the flow into the chamber is the same as the flow through the thermal MFC. Accordingly, the flow of ozone into the chamber is precisely monitored and controlled.

In a further aspect of the invention, the full-flow in-line ozone monitor provides a control voltage signal having a magnitude indicating the percentage of ozone in an ozone/oxygen gas mixture. This control voltage is received by the ozone generator, which varies the percentage of ozone generated from an oxygen flow according to the magnitude of the control voltage.

In another feature of the invention, a non-thermal MFC is placed adjacent to the chamber to accurately measure the gas flow into the chamber. The non-thermal MFC is not adversely affected by ozone flow through the MFC.

Other features and advantages will be apparent in view of the following detailed description and appended drawings.

DETAILED DESCRIPTION OF THE PREFERRED EMBODIMENTS

Figure 1:
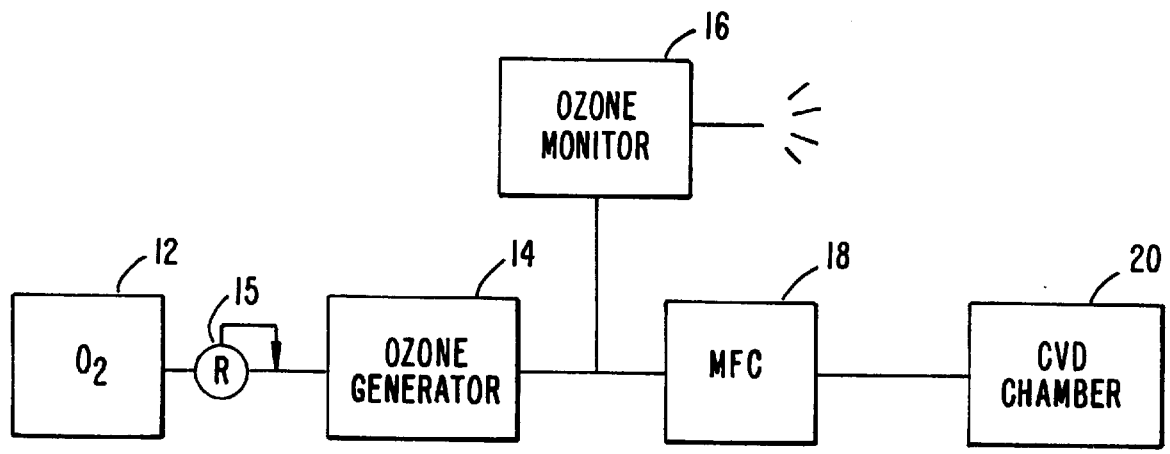
FIG. 1 is a block diagram of a prior art ozone delivery system.
Figure 2:
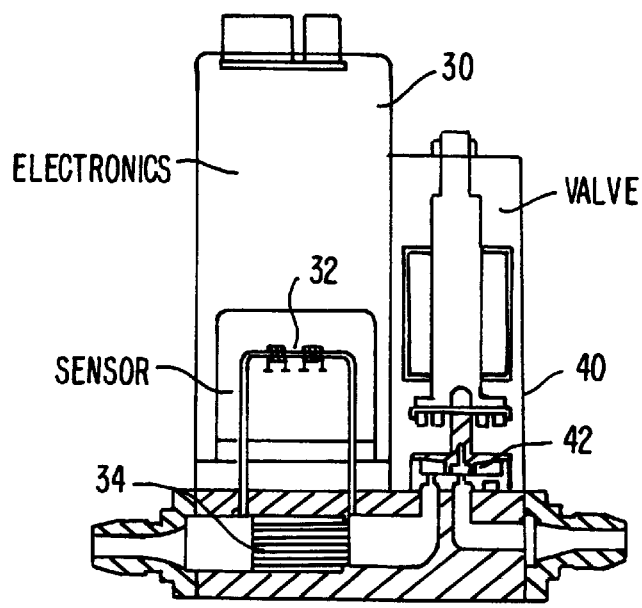
FIG. 2 is a block diagram of a thermal MFC.
Figure 3:
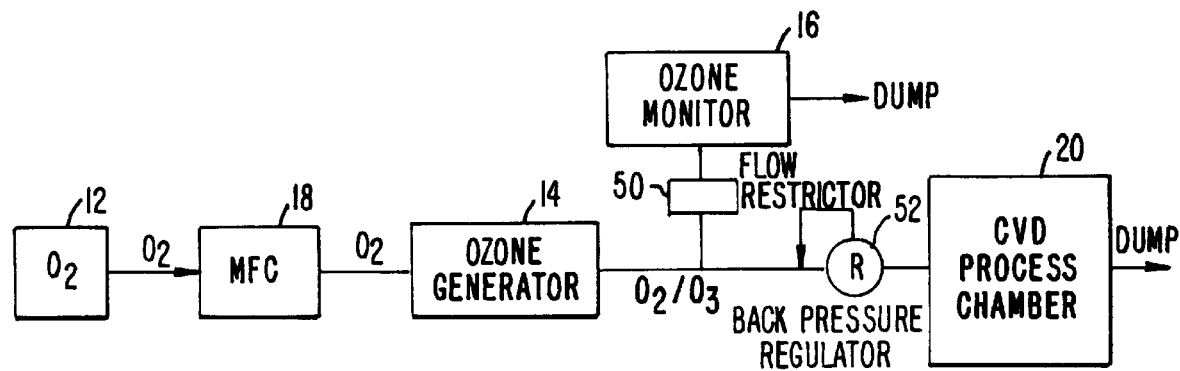
FIG. 3 is a block diagram of a first embodiment of the invention.

FIG. 3 is a block diagram of a first embodiment of the invention. Those components that are the same as described above for the standard system depicted in FIG. 1 have the same reference numbers. In FIG. 3 a thermal MFC 18 is situated upstream of an ozone generator 14 and controls the mass flow of oxygen supplied to the ozone generator. Thus, the deterioration of the performance of the heated sensing tube 32 (FIG. 1) is avoided. The features of the system which provide a precisely controlled ozone flow to a CVD chamber remote from the MFC will now be described.

The output of the ozone generator is supplied to a low flow ozone monitor through a flow restrictor 50 and to the CVD chamber 20 through a back-pressure regulator 52. The magnitude of gas flow through the flow restrictor 50 is controlled by pressure. Thus, the magnitude of the gas flow diverted into the low flow ozone monitor 16 is controlled by the magnitude of the pressure set by the back-pressure regulator 52.

As described above, the output of the low flow ozone monitor 16 utilized in the system includes contaminants and the gas flow diverted to the low flow ozone monitor 16 is dumped from the system. Thus, the mass flow to the CVD chamber 20 is not the same as the precisely controlled mass flow output from the thermal MFC 18. However, the flow rate to the CVD chamber 20 is known because the flow restrictor 50 passes a flow that is precisely controlled by the pressure set by the back-pressure regulator 52. Therefore, by utilizing the back-pressure regulator 52 to set a desired pressure the flow of gas diverted through the flow restrictor 50 is controlled.

Because of conservation of mass, the mass flow to the CVD chamber 20 is the difference of the mass flow set by the thermal MFC 18 and the flow through the flow restrictor 50. Since the magnitudes of both the mass flow through the MFC 18 and the mass flow through the flow restrictor 50 are precisely known, the magnitude of the mass flow into the CVD chamber 20 is also precisely known. Because the percentage of ozone in the ozone/oxygen mixture output by the ozone generator 14 is measured by the low flow ozone monitor 16 the precise mass flow of ozone into the CVD chamber 20 is known.

Because the MFC 18 is positioned upstream of the ozone generator 14 no ozone flows through the MFC 18 and the deleterious effects of such flow described above are avoided. Additionally, despite the remote positioning of the MFC 18 from the CVD chamber 20 the combination of the flow restrictor 50 and back pressure-regulator 52 provides for a precise measure of the magnitude of the flow diverted to the low flow ozone monitor 16 so that precise magnitude of the flow into the CVD chamber 20 is known.

Figure 4:
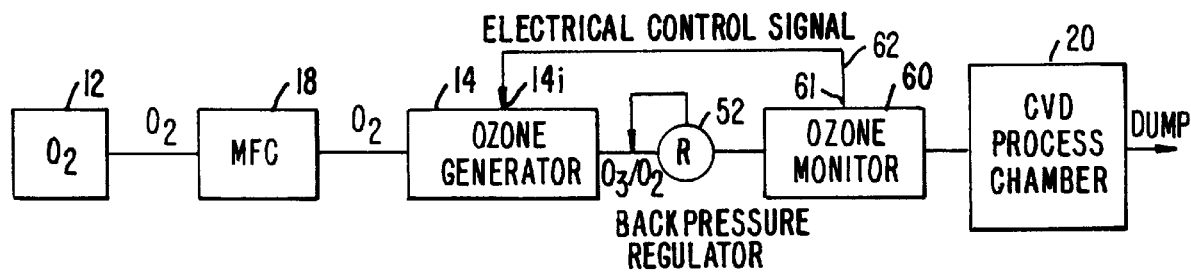
FIG. 4 is a block diagram of a second embodiment of the invention.

A second embodiment of the invention is depicted in FIG. 4. The principle difference from the embodiment of FIG. 3 is that a full-flow ozone monitor 60 is placed in-line. A full-flow ozone monitor does not introduce contaminants into the gas stream and its output flow is not dumped. Full-flow ozone monitors suitable for use with the invention are manufactured by IN USA, Needham, Mass. Such full-flow ozone monitors are more expensive than the low flow models utilized in the FIG. 3 system and thus may not be desirable in some situations.

In FIG. 4, the thermal MFC 18 is upstream of the ozone generator 14, and the output of the ozone generator 14 is coupled to the input of a full-flow in-line ozone monitor 60 by a back-pressure regulator 52. The output of the full-flow in-line ozone monitor 60 is coupled to the gas flow input port of the CVD chamber 20. A control signal line 62 couples a signal output terminal 61 of the full-flow in-line ozone monitor 60 to a control signal input terminal 14i of the ozone generator 14. Because the full mass flow output by the MFC 18 flows through the full-flow in-line ozone monitor 60, the flow into the CVD chamber 20 has the same magnitude as the flow controlled by the MFC 18.

The in-line ozone monitor 60 provides a control signal having a magnitude that indicates whether the ozone generator should generate more or less ozone. This signal is provided to the control signal input terminal 14i of the ozone generator 14 to control the amount of ozone converted from the oxygen flow input to the ozone generator. Thus, a control loop is formed to stabilize the ozone percentage of the flow at a fixed value. This control, in combination with the mass flow control by the MFC 18, provides a stable and precise flow of ozone to the CVD chamber 20. The performance of the heated sensing tube 32 in the thermal MFC 18 does not deteriorate because the thermal MFC 18 is positioned upstream of the ozone generator 14.

Figure 5:
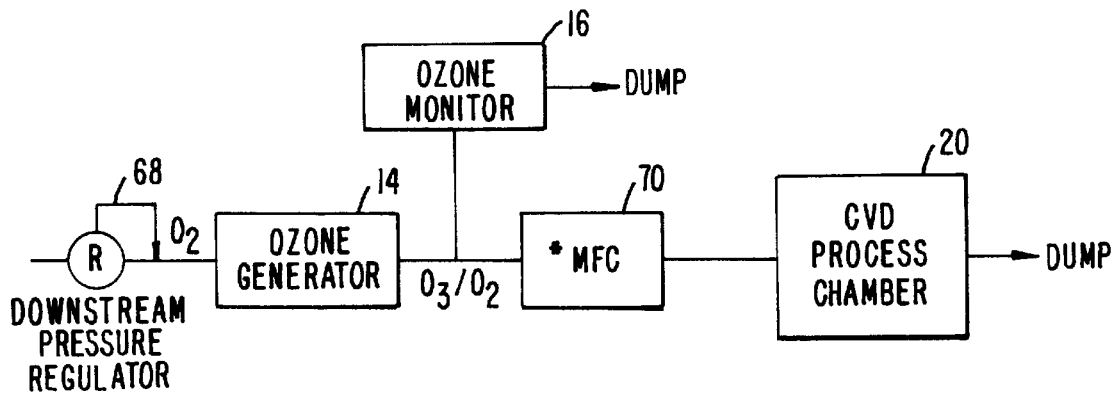
FIG. 5 is a block diagram of third embodiment of the invention.

FIG. 5 is a configuration utilizing a nonthermal MFC 70. The pressure of oxygen flow supplied to the ozone generator 14 is controlled by a downstream pressure regulator 68. As described above, in a thermal MFC 18 the ozone passing through the heated sensor tube 32 (FIG. 1) causes problems in the stability of mass flow measurement and deterioration of the performance the MFC 18. In the embodiment of FIG. 5 the nonthermal, pressure-actuated MFC 70 controls pressure upstream of a fixed orifice where the flow through the fixed orifice is supersonic. Thus, the sensor tube of the thermal MFC, which is adversely affected by the flow of ozone, is not present in this embodiment so that the pressure-actuated MFC 70 can be positioned adjacent to the CVD chamber 20. Nonthermal, pressure-actuated MFCs are manufactured by MKS Instruments, Andover, Mass.

The various components utilized in the above-described preferred embodiments are not individually part of the invention and are available from several manufactures such as:

Thermal-Based MFC:
    Unit Instruments, Yorba Linda, Calif; Model 1600, 1100 Series.
    Tylan General, Sand Diego, Calif; Model 2900 Series.
    STEC, Kyoto, Japan; Model 4400 Series.
Ozone Generator:
    ASTeX, Woburn, Mass.
    Sorbios, Berlin, Germany.
    Ebara, Tokyo, Japan.
Back Pressure Regulator:
    Tescom, Elk River, Minn.; Model 44-2300 Series.
    Veriflow, Richmond, Calif.
Low-Flow Ozone Monitor:
    IN USA, Needham, Mass.
    BMT, Berlin, Germany.
Full-Flow Ozone Monitor:
    IN USA, Needham, Mass.
Pressure-Based MFC:
    MKS Instruments, Andover, Mass; Model 1640.

The invention has now been described with reference to the preferred embodiments. Alternatives and substitutions will now be apparent to persons of skill in the art. For example, although control of ozone flow to a CVD chamber has been described, the invention can be utilized to control ozone flow in other environments. Accordingly, it is not intended to limit the invention except as provided by the appended claims.

What is claimed is:

1. A method for protecting a thermal mass flow controller in an ozone delivery system for supplying a precise mass flow of ozone to a gas input port of a chambers said method comprising:

providing a flow path extending from a source of Oxygen to the chamber;

providing a thermal-type mass flow controller (MFC) in said flow path, said mass flow controller having an MFC input port for receiving a flow of oxygen from the source of oxygen and an MFC output port for providing a controlled output mass flow of oxygen having a mass-flow magnitude, with the mass flow controller for adjusting the mass-flow magnitude of the controlled mass flow at the MFC output port to a desired value;

providing an ozone generator in said flow path, said ozone generator having a gas input port coupled to the MFC output port for receiving a mass flow of oxygen having a mass-flow magnitude equal to the desired value and a gas output port for providing a mass flow of a mixture of ozone and oxygen having a mass-flow magnitude at the desired value, with the ozone generator for converting a portion of the mass flow of oxygen received at the gas input port into ozone;

providing a back-pressure regulator in said flow path, said back-pressure regulator coupling the gas output port of said ozone generator to the gas input port of the chamber, with said back-pressure regulator for maintaining a desired pressure at the gas output port of said ozone generator;

providing an always open bypass flow line connected to said flow path between said back-pressure regulator and said gas output port of said ozone generator;

providing a low flow ozone monitor in said bypass flow line, said low flow ozone monitor having a gas monitor input port for receiving a low mass flow of the oxygen/ozone mixture, for indicating the ozone percentage of said mixture, with the low mass flow received by said low flow ozone monitor being dumped from the ozone delivery system; and providing a calibrated, fixed flow restrictor in said bypass flow line said fixed flow restrictor coupled between said flow path and said gas monitor input port of said low flow ozone monitor, for diverting a precise monitoring mass flow of the mixture output by said ozone generator to said low flow ozone monitor, with the monitoring mass flow having a mass-flow magnitude determined by the pressure maintained by the back-pressure regulator, and where the mass flow of the mixture provided to the gas input port of said chamber is equal to the difference of the desired value of the mass-flow magnitude of the controlled mass flow output by the thermal MFC and the mass-flow magnitude of the monitoring mass flow diverted to the low flow ozone monitor.

* * * * *